(12) United States Patent
Zhang et al.

(10) Patent No.: US 11,922,732 B2
(45) Date of Patent: Mar. 5, 2024

(54) INTERACTIVE SILENT LIVENESS DETECTION

(71) Applicant: PayPal, Inc., San Jose, CA (US)

(72) Inventors: Jiyi Zhang, Singapore (SG); Quan Jin Ferdinand Tang, Singapore (SG)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/551,554

(22) Filed: Dec. 15, 2021

(65) Prior Publication Data

US 2023/0186685 A1    Jun. 15, 2023

(51) Int. Cl.
| | |
|---|---|
| *G06V 40/00* | (2022.01) |
| *G06V 10/24* | (2022.01) |
| *G06V 10/60* | (2022.01) |
| *G06V 40/16* | (2022.01) |
| *G06V 40/40* | (2022.01) |

(52) U.S. Cl.
CPC ............. *G06V 40/45* (2022.01); *G06V 10/24* (2022.01); *G06V 10/60* (2022.01); *G06V 40/161* (2022.01)

(58) Field of Classification Search
CPC ........ G06V 40/45; G06V 40/40; G06V 10/24; G06V 10/60; G06V 40/161
See application file for complete search history.

(56) References Cited

U.S. PATENT DOCUMENTS

| | | | | |
|---|---|---|---|---|
| 10,796,178 | B2 * | 10/2020 | Fan ...................... | G06V 10/141 |
| 2018/0349682 | A1 * | 12/2018 | Wong .................... | G06V 40/172 |
| 2020/0311449 | A1 * | 10/2020 | Parupati ............... | G06V 10/145 |
| 2022/0245968 | A1 * | 8/2022 | Lee ........................ | G06T 7/248 |

\* cited by examiner

*Primary Examiner* — Molly Wilburn
*Assistant Examiner* — Ahmed A Nasher
(74) *Attorney, Agent, or Firm* — Greenberg Traurig, LLP

(57) ABSTRACT

A liveness detection system uses a combination of interactive and silent tests to verify physical presence of a live person at a client device. The system superimposes a box on a live video of the space in front of the client device and instructs the user to move to a position that places his or her face within the box. While the user's face is within the box, the system captures a sequence of frames from the video while an amount of illumination cast on the user's face is switched between bright and dark levels according to a random, semi-random, or predefined flash sequence. The system analyzes the resulting sequence of frames to confirm that the user's head pose is consistent with the location of the box, and that changes in brightness of the image of the user's face across the captured frames are consistent with the flash sequence.

19 Claims, 15 Drawing Sheets

INTERACTIVE SILENT LIVENESS DETECTION

TECHNICAL FIELD

The subject disclosure relates generally to computer security, and more specifically to liveness detection.

BACKGROUND

Some systems or applications can be rendered more secure by biometrically verifying a person's physical presence at a computer, mobile device, or information terminal. For example, systems that manage user-specific accounts—such as online banking or medical systems—can implement biometric verification features to ensure that only the owner of an account is permitted to access that account. Systems that collect and record electronic signatures for contracts, purchases, or approvals can also use biometric verification to ensure that the identity of the person submitting an electronic signature matches the presumed owner of the signature.

Although a client device's video camera can be used to biometrically verify the identity the person using the computer or device, this approach can be subverted by fraudulent entities using static photos or statues of the authorized person or by replacing the camera's video stream with a pre-recorded video of the authorized person.

The above-described deficiencies of current biometric verifications systems are merely intended to provide an overview of some of the problems of current technology and are not intended to be exhaustive. Other problems with the state of the art, and corresponding benefits of some of the various non-limiting embodiments described herein, may become apparent upon review of the following detailed description.

DETAILED DESCRIPTION

Figure 1:
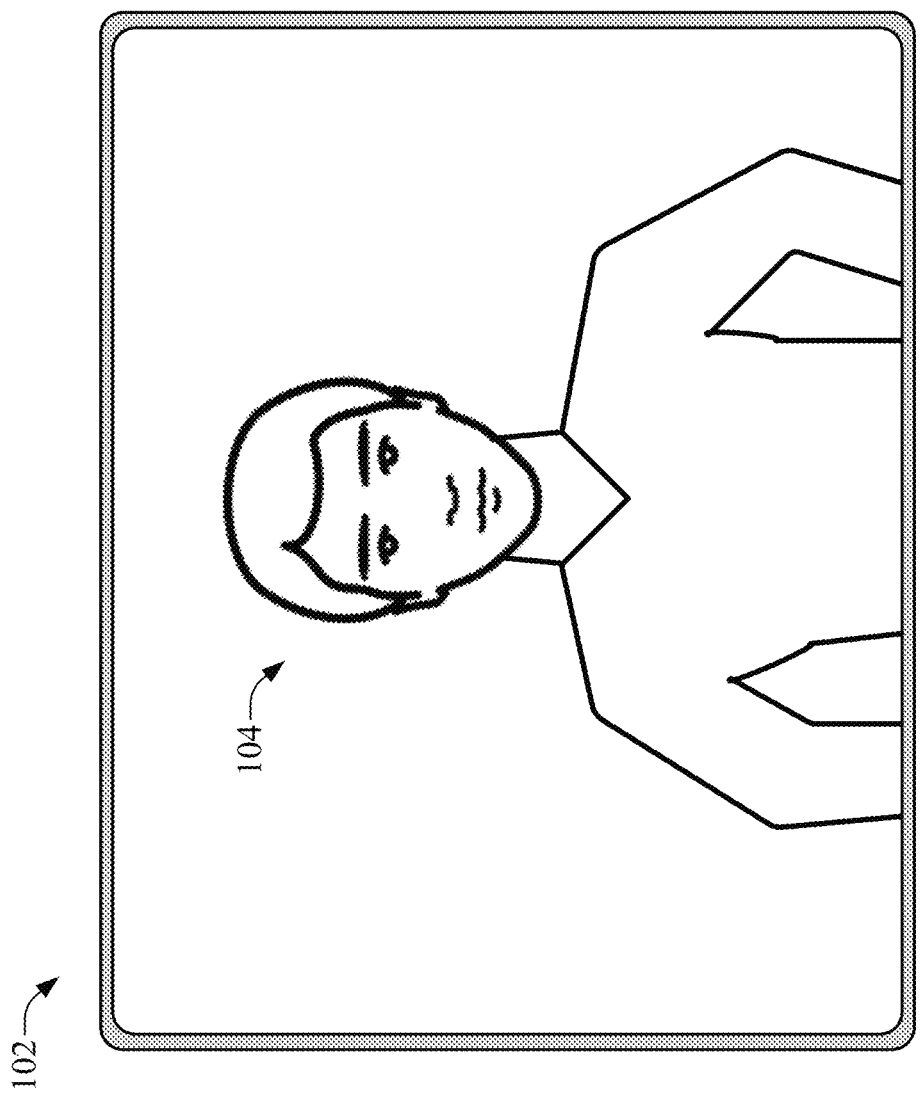
FIG. 1 is a frame of an example video captured by a camera associated with a computer, mobile device, or information terminal.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof. The following detailed description is merely illustrative and is not intended to limit embodiments or application or uses of embodiments. Furthermore, there is no intention to be bound by any expressed or implied information presented in the preceding Background section, or in the Detailed Description section.

As noted above, the integrated camera associated with a computer, mobile device, or information terminal can be used to verify the identity and presence of an individual attempting to access a system or service. FIG. 1 is a frame of an example video 102 that can be captured by a camera associated with a computer, mobile device, or information terminal. Some systems or applications can analyze the content of the video 102 to determine whether the image 104 of a person detected within the video 102 corresponds to an authorized or expected individual (e.g., an individual having permission to access a given account, an individual whose electronic signature or personal information is being submitted to the system, etc.). However, malicious entities can subvert this identity verification process using static photographs of the authorized person, life-like masks or statues, or other lifeless spoofing artefacts. In some spoofing scenarios, an unauthorized person may also replace the live video stream generated by the camera with a pre-recorded video of the authorized person, which is then wrongly authenticated by the host system. To counter these spoofing techniques, an additional security measure—referred to as liveness detection—can be put in place to verify that the image 104 within the video 102 represents a live person who is currently present at the point of video capture. However, many liveness detection approaches remain vulnerable to spoofing techniques that take advantage of inherent weaknesses in the liveness detection process.

To address these and other issues, one or more embodiments described herein are directed a liveness detection system that uses a combination of both interactive and silent tests to verify the physical presence of a live person at a client device or terminal. This combined approach yields a robust form of presence verification that can thwart attempts to subvert liveness detection using lifeless spoofing artifacts or video replacement. According to an interactive step of the liveness detection process, a box is generated at a random location within the client-side presentation of the video and the user is instructed to move to a position that places the image of his or her face within the box. While the image of the user's face is within the box, the system performs a silent test whereby a sequence of images are captured from the video while an amount of illumination cast on the user's face is switched between bright and dark levels according to a random, semi-random, or predefined flash sequence. The system then analyzes the resulting sequence of frames or images to confirm that the user's head pose is consistent with the location of the box. In some embodiments, the system may also confirm that small changes in the position of the user's head between captured frames is consistent with an expected degree of movement of a live person. The system also verifies that changes in brightness of the image of the user's face across the captured frames are consistent with the sequence of light and dark flashes. If the results of these various checks are validated, the system confirms presence of a live person at the point of image capture.

Figure 2:
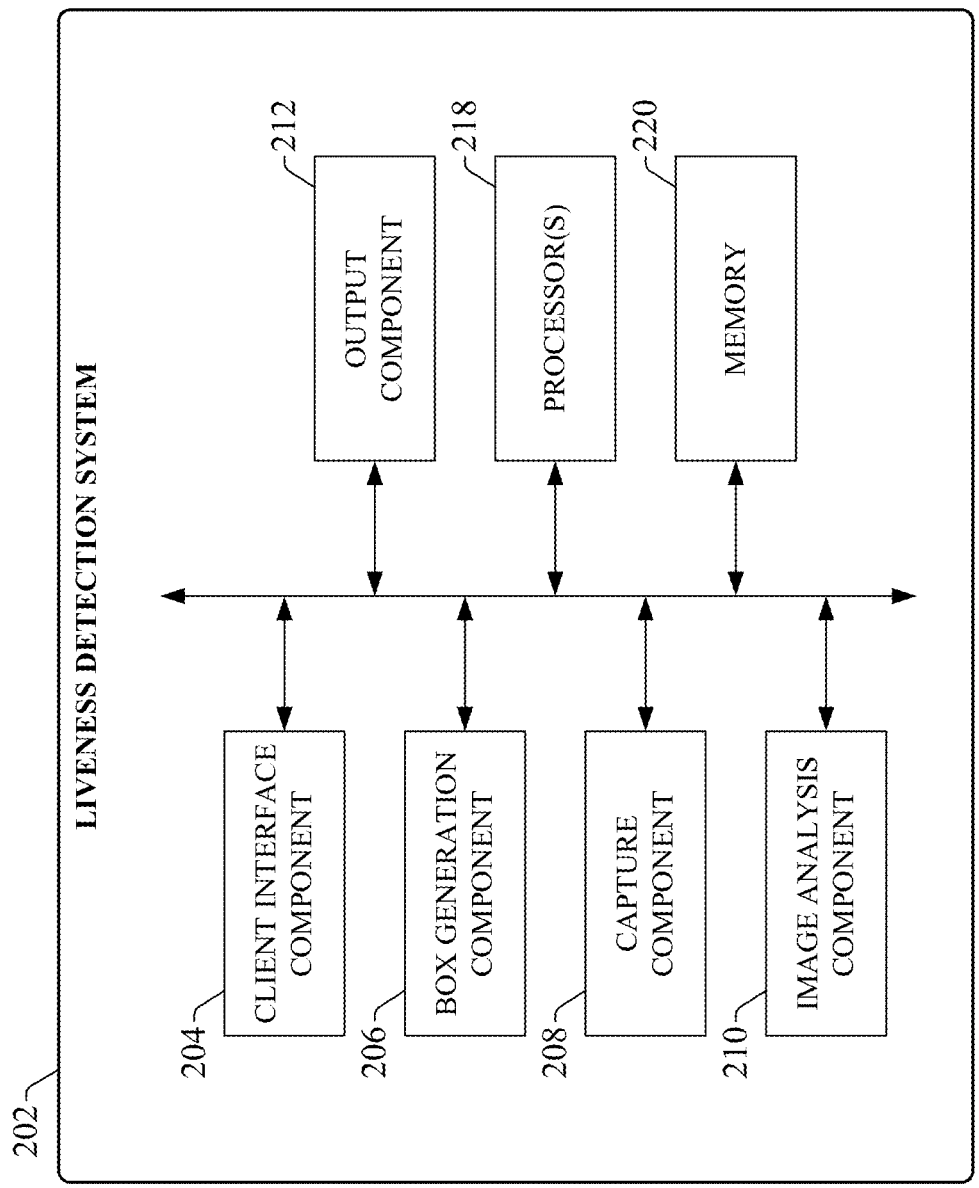
FIG. 2 is a block diagram of an example liveness detection system.

FIG. 2 is a block diagram of an example liveness detection system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Liveness detection system 202 can include a client interface component 204, a box generation component 206, a capture component 208, an image analysis component 210, an output component 212, one or more processors 218, and memory 220. In various embodiments, one or more of the client interface component 204, box generation component 206, capture component 208, image analysis component 210, output component 212, the one or more processors 218, and memory 220 can be electrically and/or communicatively coupled to one another to perform one or more of the functions of the liveness detection system 202. In some embodiments, components 204, 206, 208, 210, and 212 can comprise software instructions stored on memory 220 and executed by processor(s) 218. Liveness detection system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

Client interface component 204 can be configured to communicatively interface with a client device or information terminal that is subject to the liveness verification. The client device can have an associated video camera that captures a live video of a space in front of the client device and displays this live video on the client device's display screen. The client interface component 204 also receives this live video data for liveness detection processing. The client interface component 204 can also send data to the client device, including graphical or alphanumeric overlays to be rendered on the client-side view of the live video (e.g., graphical boxes, instructions or information directed to a user at the client device, or other such information).

Box generation component 206 can be configured to render a box graphic on the live video image displayed on the client device. The box generation component 206 can select a location within the frame of the video at which to display the box based on a current location of a human face detected within the video, such that the box is displayed away from the present location of the face. The box generation component 206 can also render alphanumeric instructions on the video instructing the user to orient his or her position to place the image of the user's face is within the box.

The capture component 208 can be configured to capture a sequence of still images or frames of the video while the image of the user's face is within the box. As part of this sequential image capture, the capture component 208 also varies the color of a margin surrounding the video image between a bright and dark color according to a random, semi-random, or predefined sequence, thereby altering the amount illumination projected onto the user's face as the frames are being captured.

The image analysis component 210 can be configured to analyze the sequence of frames captured by the capture component 208 to verify that the head pose of the image of the user's face is consistent with the location of the box relative to the original location of the user's face within the frame of the video. The image analysis component 210 can also verify that levels of brightness—or changes in brightness—measured from the image of the face within the captured frames are consistent with the sequence of bright and dark flashes generated while the sequence of frames were being captured. The image analysis component 210 confirms that the image of the face within the video represents a live person currently present at the client device if these tests yield positive results. The output component 212 can be configured to generate an informational or instruction output that either verifies liveness of the person at the client device or indicates that liveness could not be confirmed.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
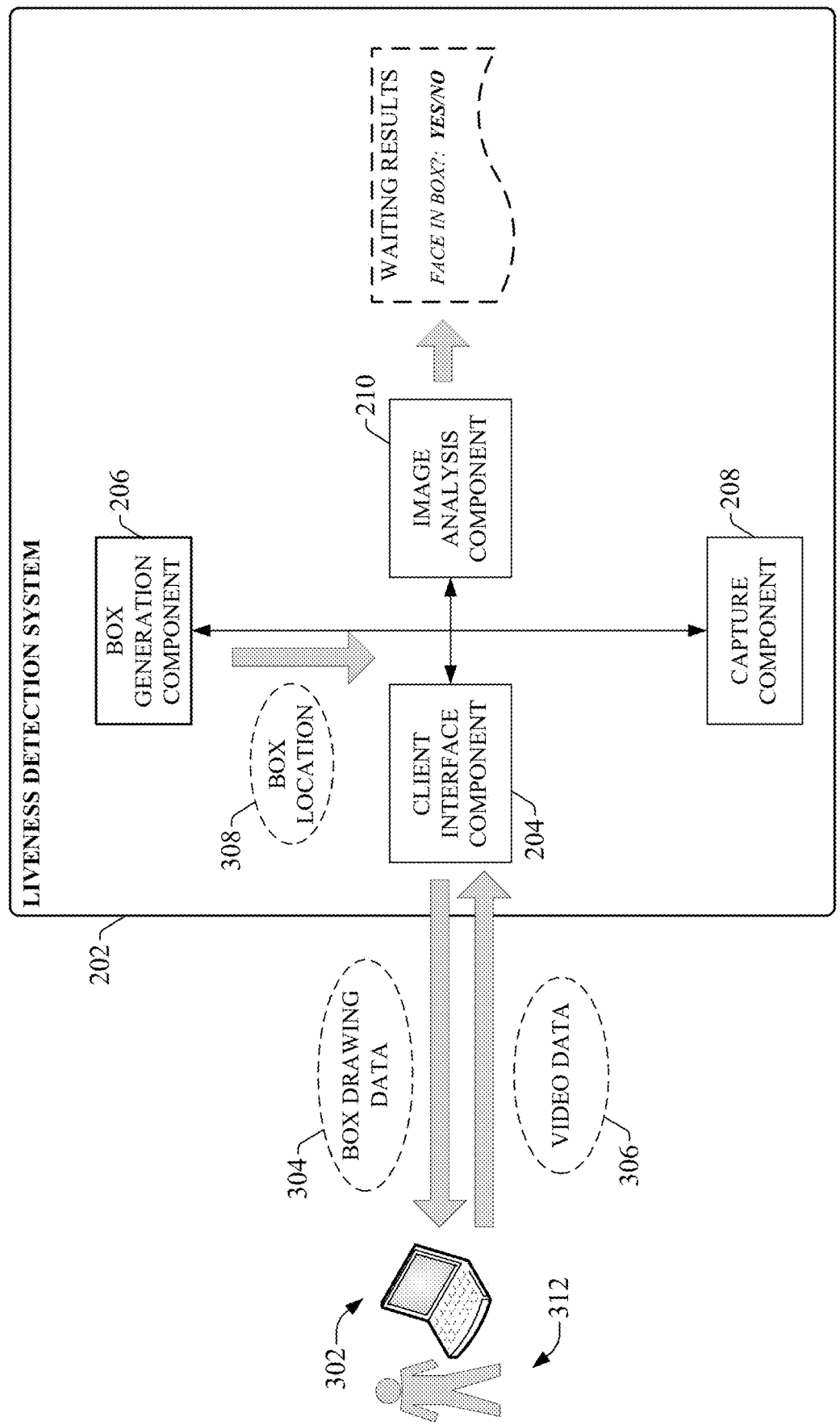
FIG. 3 is a diagram illustrating example data flows associated with an initial stage of the liveness detection process.

The general steps carried out by system 202 to verify liveness of a user at a client device are now described. FIG. 3 is a diagram illustrating example data flows associated with an initial stage of the liveness detection process. In this example, a user 312 at client device 302 is performing a transaction with a system, application, or service (not shown in FIG. 3) that requires verification of the user's current physical presence at the client device 302. The information system may be, for example, a financial or banking system, a system for submitting or accessing medical records, a system for collecting and managing electronic signatures, a registration system, a user tracking system, or other such systems. In an example implementation, the liveness detection system 202 may be a sub-system of this higher-level system that verifies physical presence of a live person at the client device 302 at the time of the transaction. The client interface component 204 of the liveness detection system 202 can communicatively interface with the client device 302 over one or more of a private network (e.g., an office network or residential network) or a public network such as the internet.

The client device 302 has an associated video camera that captures a live video of a space in front of the client device 302. The camera is oriented to capture at least the head and a portion of the upper body of a user 312 standing at the client device 302. When the liveness detection routine is initiated, the client interface component 204 begins receiving live video data 306 obtained by the client device 302 (if the video data 306 is not already being received). The video captured by the client device 302 is also rendered on the display screen of the client device 302, providing visual feedback to the user 312 during the liveness detection process.

Using any suitable type of video analysis, the image analysis component 210 analyzes the video data 306 to determine whether an image corresponding to a human face is detected within the video. Example types of video analysis for detecting a human face can include, but are not limited to, one or more of facial recognition analysis, edge detection analysis, shape recognition analysis, machine learning, or other such analytic techniques. Once a human face is detected within the video (e.g., using facial detection processing or another suitable technique for identifying a human ace within a video image), the image analysis component 210 records the present location of the face within the frame of the video. The box generation component 206 then selects another location within the frame of the video at which to superimpose a box or square. The box generation component 206 sends box location information 308 informing the client interface component 204 where the box should be rendered within the frame of the video, and the client interface component 204 sends box drawing data 304 to the client device 302, which renders the box on the client-facing view of the video in accordance with the drawing data 304. The client interface component 204 also renders an instruction on the client device 302—e.g., an alphanumeric instruction rendered within the video itself or elsewhere on the interface display, an audible instruction, or another suitable formatted instruction—instructing the user to shift his or her posture such that the image of the user's face moves to a location within the box.

Figure 4:
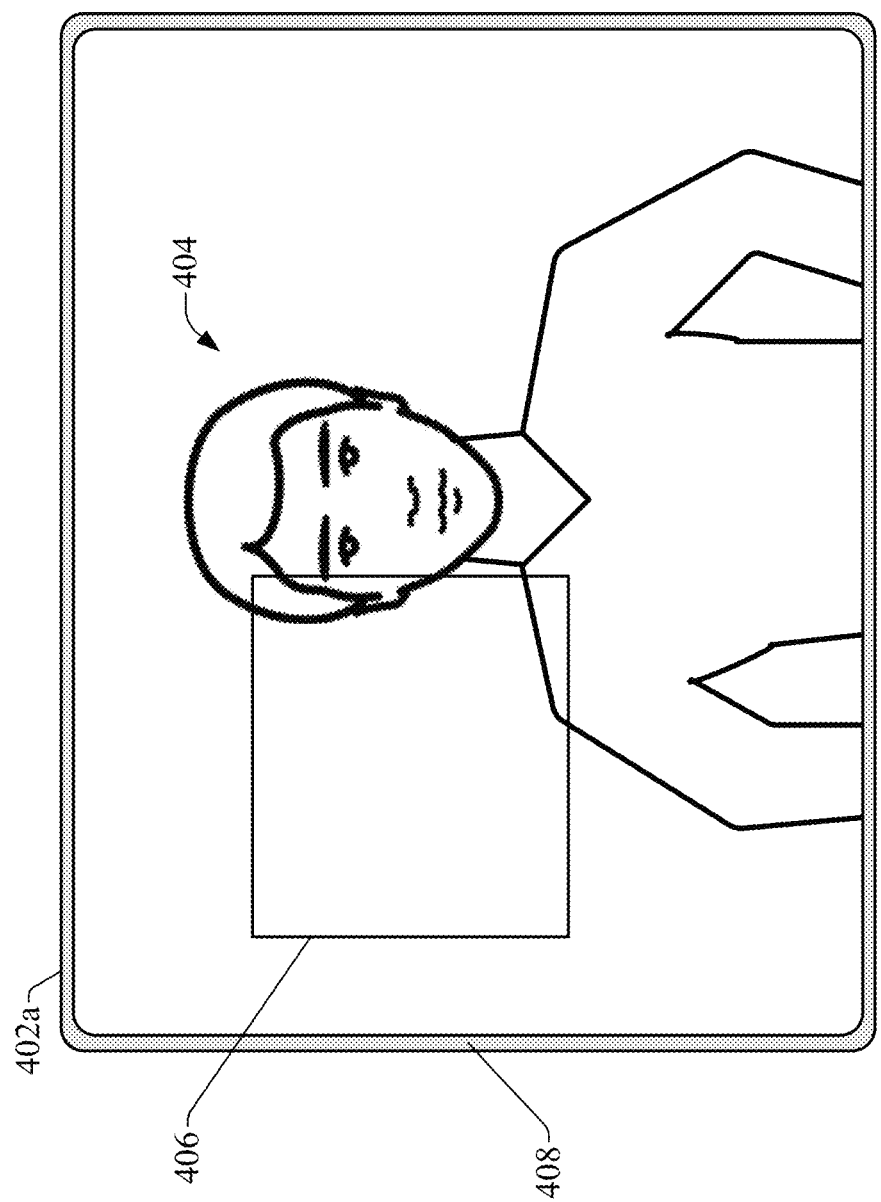
FIG. 4 is a frame of an example video in which a box has been superimposed to the left of a user's face.
Figure 5:
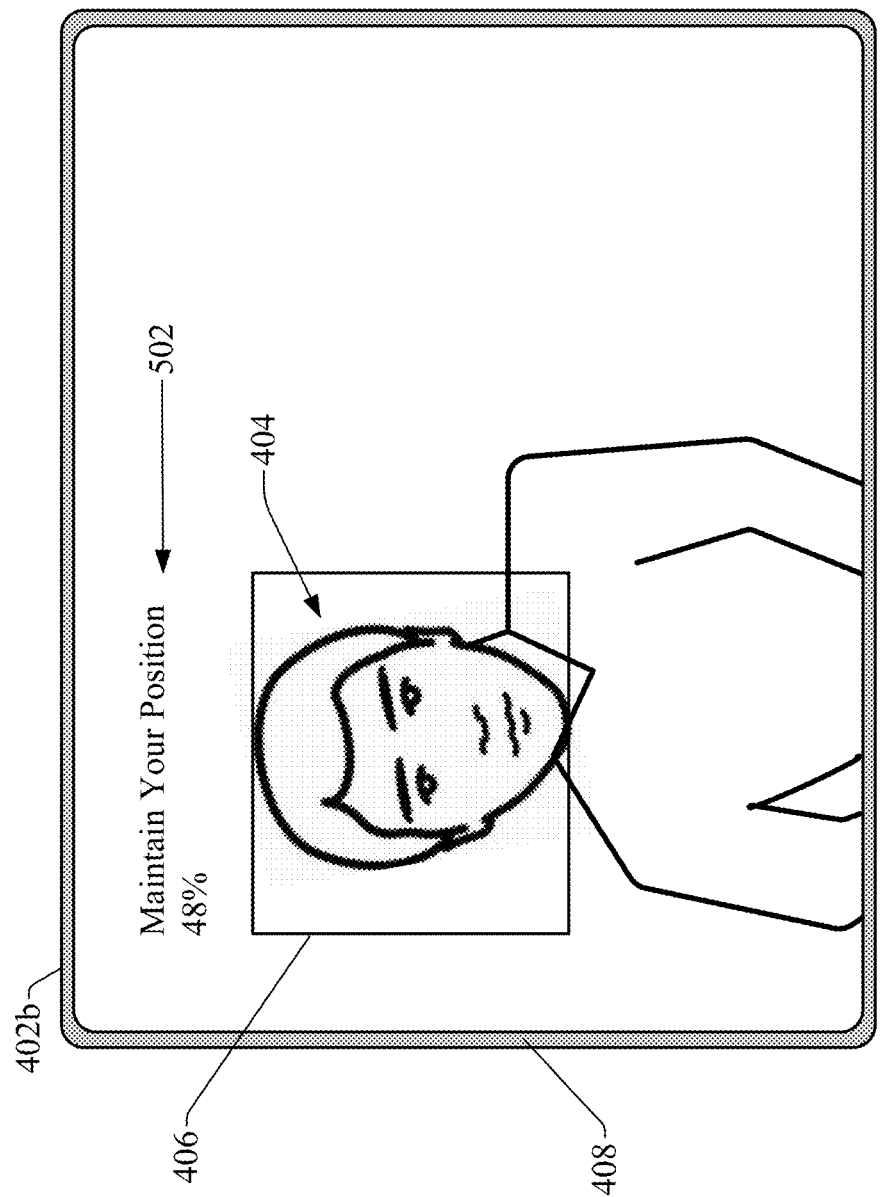
FIG. 5 is a frame of the example video depicting a scenario in which the user has moved to a position that places the image of the user's face within the box.

This initial stage of the liveness detection routine is illustrated with reference to FIGS. 4 and 5. FIG. 4 is a frame 402a of an example video captured by the client device 302 in which a box 406 has been superimposed to the left of the user's face. The video frame 402a represents the client-side view of the video rendered on the client device 302 and presented to the user, and the user image 404 is the live video representation of the user who is present at the client device 302. When liveness detection is initiated, the image analysis component 210 can identify the user image 404, identify the portion of the user image 404 representing the user's face, and record the present (initial) location of the user's face within the frame (e.g., in terms of an x-y coordinate of the approximate center of the image 404). Based on the present location of the user's face within the frame 402a of the video, the box generation component 206 selects another location within the frame 402a at which to render a two-dimensional box 406. The box generation component 206 sizes the box 406 to be larger than the image of the user's head, such that the portion of image 404 representing the user's head can be encompassed within the box 406 if the user positions his or her body accordingly. The box generation component 206 selects a location for the box 406 that ensures the box 406 does not overlap with the image of the user's face, or only partially overlaps with the image of the user's head such that a majority of the user's head is initially outside the box 406. In some embodiments, the box generation component 206 can select the box location randomly or semi-randomly, but constrained by the requirement that a majority of the image of the user's face must initially be outside the box 406. Other constraints may also be placed on the location of the box 406 in some embodiments. For example, the box generation component 206 may be configured to only locate the box 406 to the left or right of the image of the user's head, but not above or below the image of the user's head, ensuring that the user 312 can easily comply with the instruction to position the image of his or her face within the box 406.

The client interface component 204 then renders the instruction for the user to position his or her body in front of the client device 302 such that the image of the user's face is inside the box 406. FIG. 5 is a frame 402b of the example video depicting a scenario in which the user has complied with the instruction to move to a position that places the portion of image 404 representing his or her head within the box 406. Since the box 406 was rendered at a location away from the initial location of the user's head (e.g., to the left or right of the user's head), the user is required to reorient his or her body by leaning to one side or the other, forcing the user's head to assume a head pose or orientation that the system 202 can verify as being consistent with the position of the box 406 relative to the initial location of the user's head, as will be described in more detail below.

After rendering the instruction for the user to move his or her head inside the box 406, the system 202 enters a waiting stage during which the image analysis component 210 monitors the video to determine whether the portion of image 404 representing the user's head has moved inside the box 406. In some embodiments, the system 202 may place a time limit on this waiting stage such that, if the image of the user's head does not position itself within the box 406 prior to expiration of the time limit, the system 202 exits the liveness detection routine and renders a time-out notification on the client device 302 without verifying liveness. Alternatively, if the image analysis component 210 determines that the image of the user's head has moved inside the box 406—as shown in FIG. 5—prior to expiration of the waiting time limit, the system 202 enters a capturing stage during which a sequence of frames of the video are captured for analysis.

Figure 6:
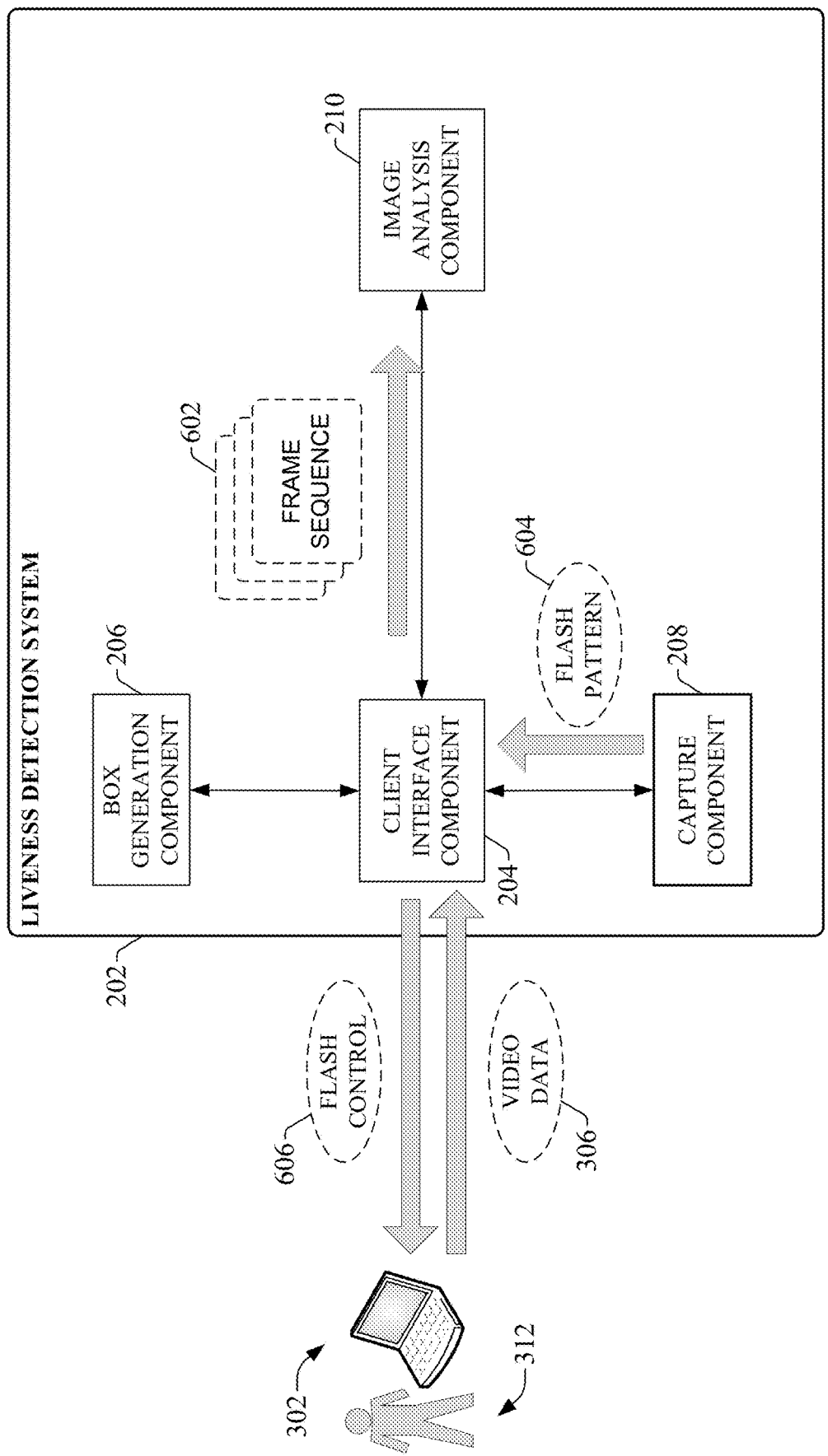
FIG. 6 is a diagram illustrating example data flows associated with a capture stage of the liveness detection process.

FIG. 6 is a diagram illustrating example data flows associated with the capture stage of the liveness detection process. During this stage, the capture component 208 of the system 202 captures a sequence of frames 602 of the video data 306 while the image of the user's head remains inside the box 406. During this capture stage, the client interface component 204 can render an instruction on the client device 302 (e.g., instruction 502 shown in FIG. 5) for the user to maintain his or her current position while the sequence of frames 602 are being captured.

As part of this capture stage, the liveness detection system 202 implements a silent step of the liveness detection process, which acts as a second means of liveness verification that supplements the interactive step described above. According to this silent step, the capture component 208 generates a flash pattern 604 that defines a sequence of bright and dark flashes to be cast on the user's face while the sequence of frames 602 are being captured. In some embodiments, the flash pattern 604 can be defined in terms of which of two colors—either bright or dark—is to be cast on the user's face for each frame capture. In various embodiments, capture component 208 can generate this flash pattern 604 randomly or semi-randomly, or according to a predefined pattern.

The means by which the flashes are cast on the user's face can vary depending on the capabilities of the client device 302. For example, in some embodiments the client interface component 204 can generate a bright flash on the client device's interface display by setting a color of the video frame's margin 408 or outline to white, and can generate a dark flash by setting the color of the video frame's margin 408 or outline to black (see margin 408 in FIGS. 4 and 5).

The flash pattern 604 in such embodiments can therefore define, for each frame capture, whether the video's margin 408 is to be set to white or black for that capture. Since the amount of light cast on the user's face by the client device's interface display will change when the video's margin 408 transitions between black and white, the flash pattern 604 will cause the brightness measured from the image of the user's face to change in expected or predictable ways when the color of the margin 408 switches between black and white. In other example embodiments, the bright flashes can be realized using a light source associated with the client device 302 and directed to the user. The flash pattern 604 in such embodiments can specify which frame captures are to be obtained while the light source is turned on and which captures are to be obtained with the light source turned off. Other approaches for setting an illumination level for respective video frame captures are also within the scope of one or more embodiments.

During the capture stage, the client interface component 204 sends flash control signals 606 to the client device 302 in accordance with the flash pattern 604 generated by the capture component 208. These flash control signals 606 set the color of the video's margin 408 for each of a series of frame captures in accordance with the defined flash pattern 604. For example, for each of a series of frame captures, the client interface component 204 sets the color of the video's margin 408 to be either black or white as specified by the flash pattern 604 (if the flash is being controlled via the color of the video's margin 408), captures a frame of the video data 306, and adds this captured frame to the sequence of frames 602 that will be analyzed. In embodiments in which the flash is controlled by setting the on/off state of a light source at the client device 302, the flash control signals 606 can instead set the prescribed on/off state prior to each frame capture.

Figure 7:
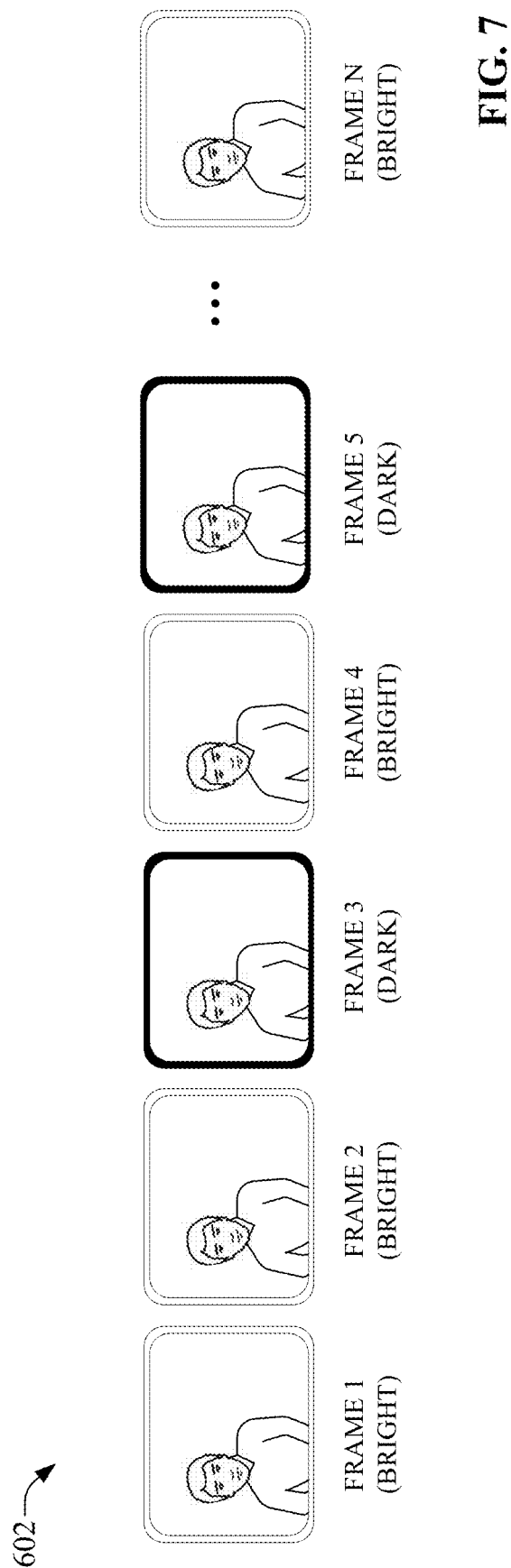
FIG. 7 is representation of an example sequence of frames captured by the liveness detection system during the capture stage.

FIG. 7 is representation of an example sequence of N frames 602 captured by the system 202 during the capture stage, where N is an integer. In general, the capture component 208 will capture a defined number of frames (N) during the capture stage for analysis. As shown in FIG. 7, some of the frames in the sequence will be captured while the video margin color is set to white (corresponding to a bright frame) while the remaining frames in the sequence will be captured while the video margin color is set to black (corresponding to a dark frame). The setting of a given frame as being either a bright or dark frame is determined by the flash pattern 604 generated for the current liveness detection session. In some embodiments, the capture component 208 can generate a different flash pattern 604 for each liveness detection session so that the flash pattern 604 cannot be predicted by potential spoofers. The sequence of bright and dark frames need not be strictly alternating. Rather, some flash patterns 604 may include multiple consecutive frames of a same type (e.g., bright or dark), followed by one or more frames of the opposing type. For example, in the example sequence depicted in FIG. 7, a series of two bright frames (Frames 1 and 2) are followed by a dark frame (Frame 3), which itself is followed by another bright frame (Frame 4). As noted above, the white or black margin colors cast a corresponding bright or dark illumination on the user's face at the time each frame is captured (by virtue of the change in illumination cast by the client device's display screen when the margin 408 switches between black and white), producing a predictable amount of brightness—or a predictable change in brightness—that can be measured from the image of the user's face in each frame. For example, bright frames may cause portions of the user's face that are not in shadow to be rendered more brightly in the captured image relative to dark frames, and to have a higher contrast with the shadowed portions of the image of the user's face relative to dark frames.

In some embodiments, if the system 202 detects that portion of the user image 404 representing the user's face has moved outside the box 404 during the capture stage, the system 202 can abort the capture sequence, re-initiate the liveness verification process, and re-instruct the user to position his or her head within the box 404. The system 202 will not verify liveness if the user moves his or her head outside the box 404 while frames are being captured during the capture stage.

Figure 8:
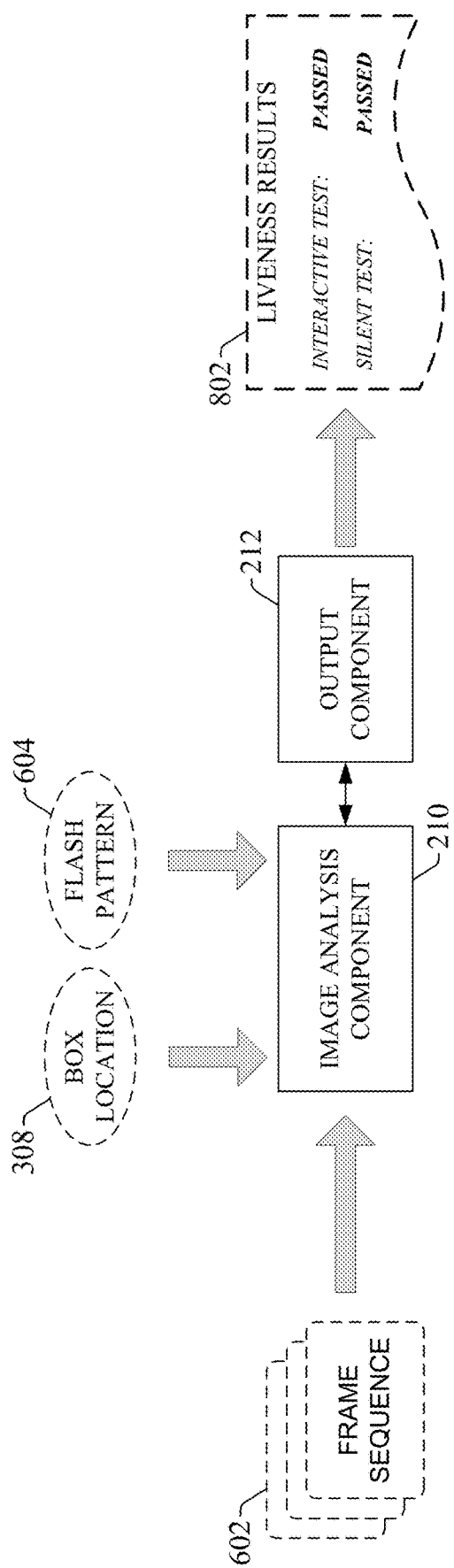
FIG. 8 is a diagram illustrating liveness analysis performed on the sequence of frames by an image analysis component.

When N frames have been captured during the capture stage, the system 202 enters a checking stage, whereby the resulting sequence of frames 602 is sent to the image analysis component 210 for liveness verification analysis. FIG. 8 is a diagram illustrating liveness analysis performed on the sequence of frames 602 by the image analysis component 210. During the checking stage, the image analysis component 210 analyses the sequences of frames 602 to obtain results for both the interactive test (described above in connection with FIGS. 3-5) and the silent test (described above in connection with FIGS. 6 and 7).

To verify the interactive test, image analysis component 210 verifies that the pose or orientation of the user's head in each of the captured frames is consistent with the location of the box 406 relative to the initial location of the user's head within the frame. The expected pose or orientation of the user's head in each captured frame can depend on both the location of the box 406 within the video frame (as specified by box location data 308) and the initial position of the user's head before the user moved his or her head inside the box 406. For example, if the box 406 was rendered on the left side of the video frame—and thus to the left of the image of the user's head—the user is expected to lean toward the left side of the frame to position the image of his or her head inside the box 406. The image of the user's head may also be expected to tilt toward the left side of the frame. Moreover, the user's head may be expected to be turned slightly to the right in order to continue looking at the client device's display while leaning toward the left. In some scenarios, the degree to which the user is expected to tilt or turn his or her head may be a function of how far away the box 406 is from the initial location of the user's head. If the box 406 is rendered on the right side of the frame, these expected poses and orientations will be reversed. The image analysis component 210 analyzes each frame in the sequence to determine whether the image of the user's head conforms to these expected head poses and orientations within defined tolerances. If the user's head pose or orientation does not conform to expectations given the box location, the image analysis component 210 registers a failure of the interactive test.

In some embodiments, the image analysis component 210 may also determine whether a small degree of variation in the location or pose of the user's head is detected between frames of the captured frames. Since a small amount of head movement between frame captures is expected of a live person who is present at the point of image capture, such embodiments of the image analysis component 210 will only register a pass result for the interactive test if small variations in the position or orientation of the user's head, consistent with natural movements, are detected between frames. In an example approach, the image analysis component 210 can measure a degree of movement in one or more of the location, angle of tilt, or degree of turn of the user's head between pairs of consecutive frames of the sequence, and will only register a pass result for the interactive test if these measured changes are greater than zero but below a specified degree of tolerance. If no small changes in the position or orientation of the user's head are detected between frames, which may be indicative of a spoofing attempt using a still image of a person, the image analysis component 210 can register a fail result for the interactive test. In some embodiments, the image analysis component 210 can use a machine learning approach (e.g., a neural network) to infer an expected degree of natural user movement between frames, and confirm that changes in head location and orientation between frames are consistent with this expected degree of natural movement. This machine learning may also be trained to distinguish between expected degrees of natural user movement based on user demographics—e.g., an adult versus a young child—that may determine the degree to which the user is expected to move between frames (e.g., a young child may be expected to demonstrate a greater degree of natural movement between frames than an adult). In such embodiments, a pass result for the interactive test can be contingent on the measured degree of user movement being consistent with this inferred degree of natural movement.

Some embodiments of the image analysis component 210 may also analyze the sequence of frames 602 to confirm that there are no sudden changes in the user's position or orientation between frames (that is, sudden changes that are not consistent with natural movement). In these embodiments, if a sudden change in excess of a specified threshold is detected between consecutive frames, the image analysis component 210 can register a fail result for the interactive test.

If the interactive checks described above are validated, the image analysis component 210 registers an overall pass result for the interactive test. In addition to this interactive test, the image analysis component 210 also analyzes the sequence of frames 602 to verify the silent test, confirming that the amount of reflected light measured from the image of the user's face in each frame is consistent with the flash pattern 604. In particular, since a known flash pattern 604 was used to control the projection of bright or dark flashes on the user's face while the frames were being captured, the image analysis component 210 can measure an amount of brightness (or another metric of reflectivity) from the image of the user's face for each frame of the sequence to determine whether the brightness of the user's face responded as expected to the changes between bright and dark flashes.

For example, returning to the sequence depicted in FIG. 7, it is known that Frame 2 of the sequence was captured while the video margin was set to white (corresponding to a bright flash) and that Frame 3, which is immediately consecutive to Frame 2, was captured while the video margin was set to black (corresponding to a dark flash). Accordingly, the image analysis component 210 can verify that an amount of brightness measured from the user's face in Frame 3 decreased by an expected degree relative to the amount of brightness measured from the user's face in Frame 2. Also, since Frame 1 and Frame 2 are consecutive frames that were captured under the same type of flash (a bright flash), the amount of brightness measured from the image of the user's face in those frames is expected to be substantially equal for both frames (within a degree of tolerance). The image analysis component 210 can perform these checks for each consecutive frame in the sequence, and will register a pass result for the silent check if the variation in the amount of brightness measured from the image of the user's face varies across the frames in a manner that is consistent with the flash pattern 604 that was used to capture the sequence. This silent test ensures that the image of the face within each captured frame represents a physical entity present at the client device 302 at the time the frames were captured rather than a spoofing video stream. In various embodiments, the image analysis component 210 can measure the amount of facial brightness as an average brightness of the pixels that make up the image of the face or as an average brightness of a selected subset of the pixels that make up the image of the face.

In some embodiments, the image analysis component 210 can also be configured to verify that shadows detected on the image of the user's face respond to the changes in bright and dark flashes as expected. For example, when the flash pattern 604 causes a change from a dark flash to a bright flash between two consecutive captured frames, it may be expected that the contrast between the shadow cast on the user's face by the user's nose and the facial area outside of this shadow will increase between those frames. This expected response differentiates from the response of a flat still photograph of a person presented at the client device 302, which will not produce such an increase in contrast when the illumination cast on the photograph is increased. Accordingly, some embodiments of the image analysis component 210 can include this contrast verification check as part of the silent test and will only register a pass result for the silent test if the amount of contrast between shadowed and light portions of the user's face change between frames as expected given the flash pattern 604.

Although the foregoing examples assume that the flash pattern 604 is realized at the client device by changing the color of the video margin 408 between black and white, other mechanisms for altering the amount of illumination on the user's face according to a pattern of light and dark flashes are within the scope of one or more embodiments, including but not limited to a light source integrated with the client device 302.

Returning to FIG. 8, based on results of the analyses described above, the output component 212 outputs liveness detection result data 802 indicating whether the image of the person detected in the video data 306 represents a live person who is physically present at the client device 302 at the time of video capture. In particular, the image analysis component 210 will indicate that the image of the person represents a live person present at the client device 302 only if PASS results are obtained for both the interactive test and the silent test. If the image analysis component 210 registers a FAIL result for either of the interactive test or the silent test, the liveness detection result data 802 will indicate that the image of the person detected in the video data 306 does not represent a live person who is physically at the client device 302 at the time the video data 306 was captured.

The liveness detection result data 802 can include results of the liveness tests at any degree of granularity according to various embodiments. For example, some embodiments of the system 202 may output a simple PASS or FAIL result as the liveness detection result data 802. Other embodiments may include a greater level of detail regarding the liveness test results, including but not limited to individual PASS or FAIL results for the interactive and silent tests, information regarding why a test failed (e.g., insufficient facial brightness response to changes in the flash pattern, incorrect head pose given the location of the box 406, etc.), information describing the flash pattern that was used for the silent test, the location of the box used for the interactive test, or other such information. In the event that liveness of a legitimate user present at the point of image capture was not verified, this information can identify improper movements or behaviors that may have caused the system 202 to generate a FAIL result, providing guidance to the user for correcting these movements and behaviors during a subsequent verification sequence.

Figure 9:
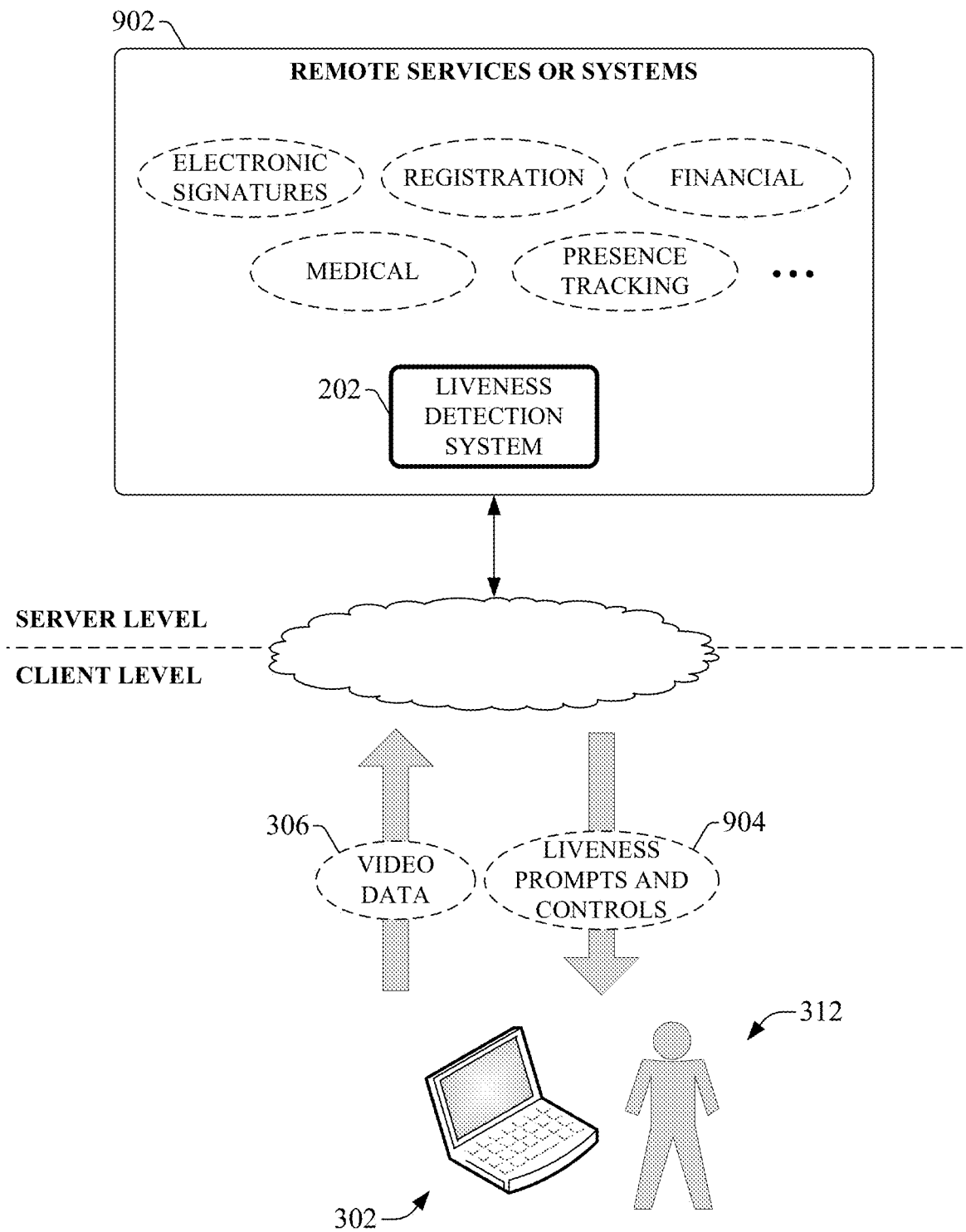
FIG. 9 is a diagram illustrating a generalized architecture in which the liveness detection system is an integrated subsystem of a high-level system or remote service.

Embodiments of the liveness detection system 202 can be integrated into substantially any type of system that requires verification that a live person is physically present at a client device or information terminal. FIG. 9 is a diagram illustrating a generalized architecture in which the liveness detection system 202 is an integrated subsystem of a high-level system 902 or remote service. Systems, services, or applications in which the liveness detection system 202 can be used can include, but are not limited to, electronic signature systems, user registration systems, financial or banking systems, medical information systems, presence tracking systems, or other such applications. In this example architecture, a high-level system 902 resides on a cloud platform, a public network such as the Internet, or a remote server. The system 902 may be substantially any type of system, service, or application requiring liveness verification, including but not limited to an electronic signature system, a user registration system, a financial or banking system, a medical information system, a presence tracking system, or another such application. The client device 302 or other type of information terminal resides at a client level and remotely interfaces with the system 902 to utilize the services offered by the system 902.

In this architecture, liveness detection system 202 is an integrated subsystem of the larger system 902 that serves to verify liveness of a user 312 who is physically present at the client device 302. To this end, the liveness detection system 202 sends liveness prompts and controls 904 to the client device 302 (e.g., superimposed box 406, user instructions, flash control signals 606, etc.) and collects video data 306 captured by the client device 302 for analysis, as described above. Using the liveness detection approach described herein, the liveness detection system 202 can inform the system 902 whether the image of the user 312 detected in video data 306 represents a live user who is physically at the client device 302 at the time of the present session, thereby adding a layer of security that prevents unauthorized access or impersonation by malicious entities using lifeless spoofing artifacts or pre-recorded video streams.

Embodiments of the liveness detection system 202 described herein combine interactive and silent detection techniques to yield a comprehensive and robust liveness detection solution that can accurately assess liveness at a client device or information terminal. Application of both interactive and silent liveness detection tests can accurately detect spoofing attempts using lifeless artifacts, such as still photographs or statues, or pre-recorded replacement video streams of an authorized person.

FIGS. 10*a*-10*d* illustrate a methodology in accordance with one or more embodiments of the subject application. While, for purposes of simplicity of explanation, the methodology shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 10A:
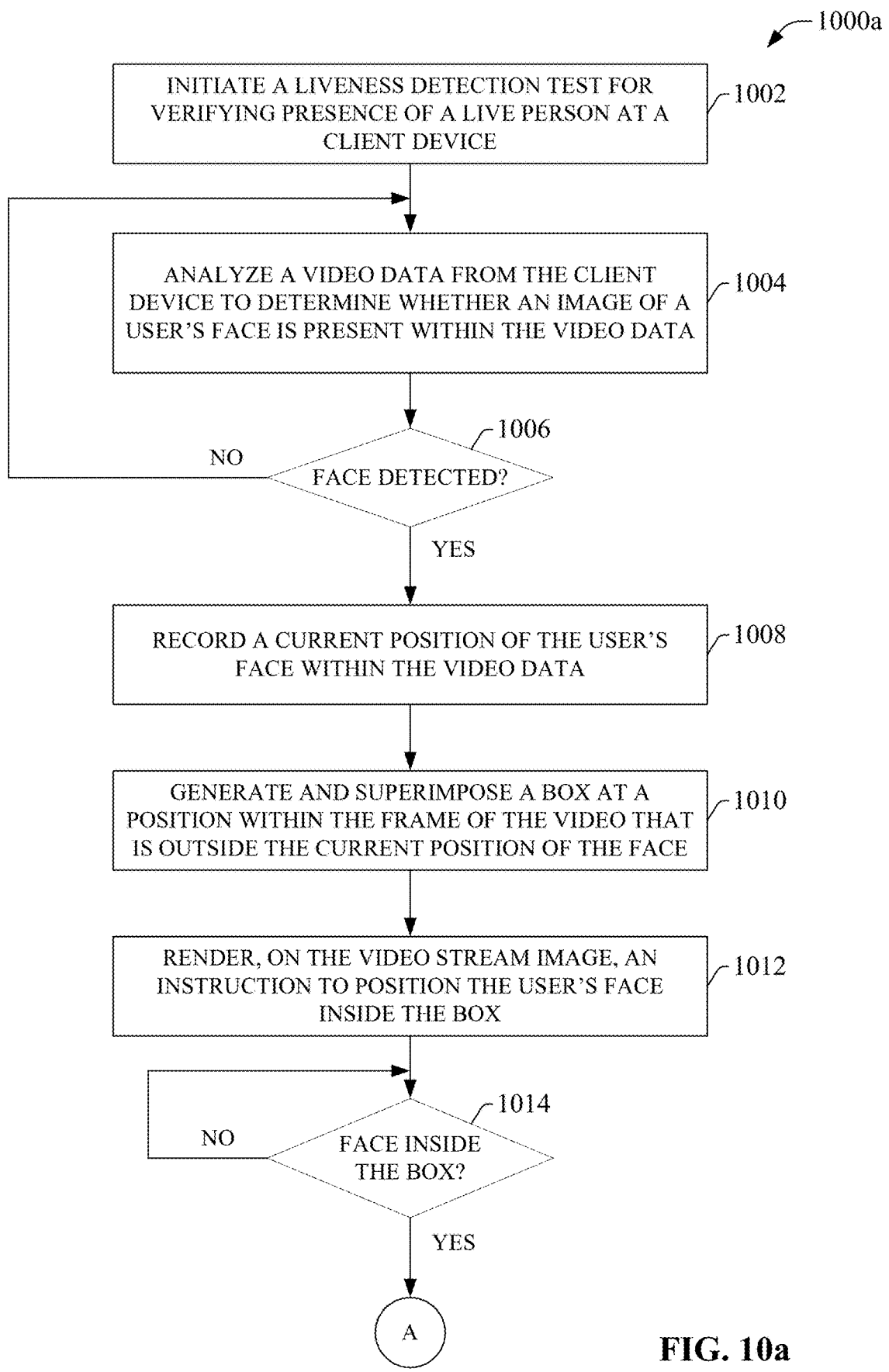
FIG. 10a is a flowchart of a first part of an example methodology for verifying physical presence of a live person at a client device or information terminal.
Figure 10B:
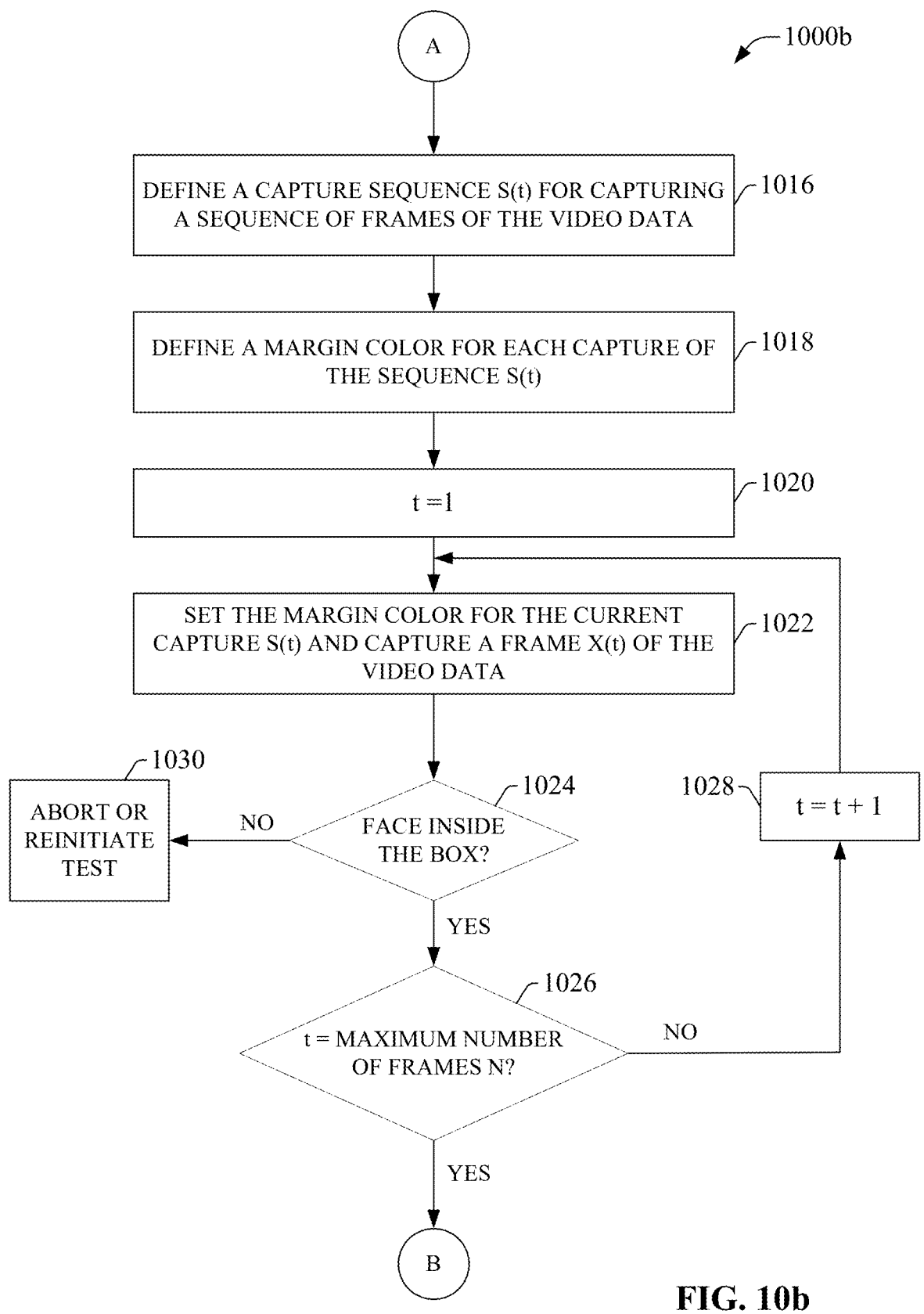
FIG. 10b is a flowchart of a second part of the example methodology for verifying physical presence of a live person at a client device or information terminal.
Figure 10C:
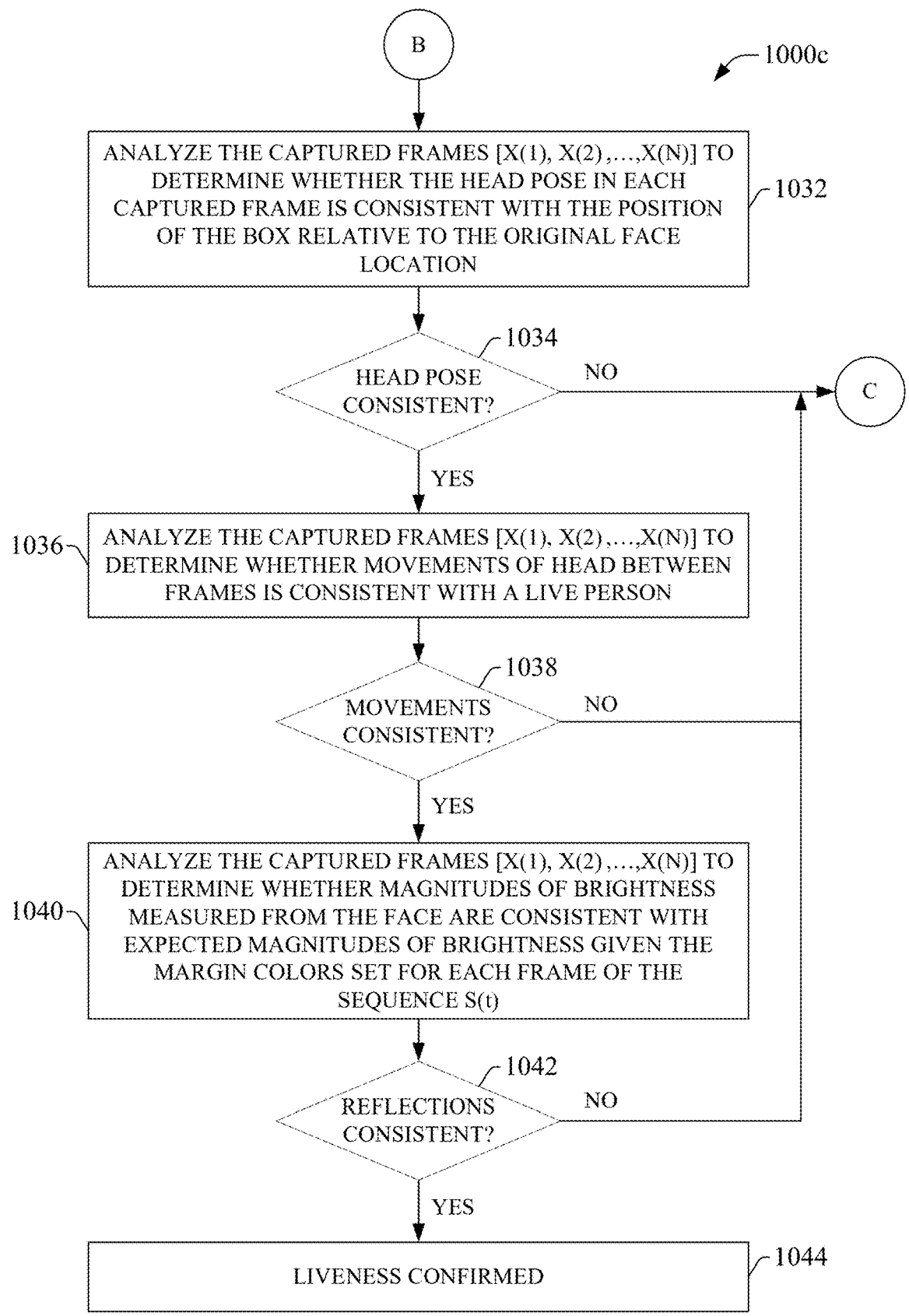
FIG. 10c is a flowchart of a third part of the example methodology for verifying physical presence of a live person at a client device or information terminal.
Figure 10D:
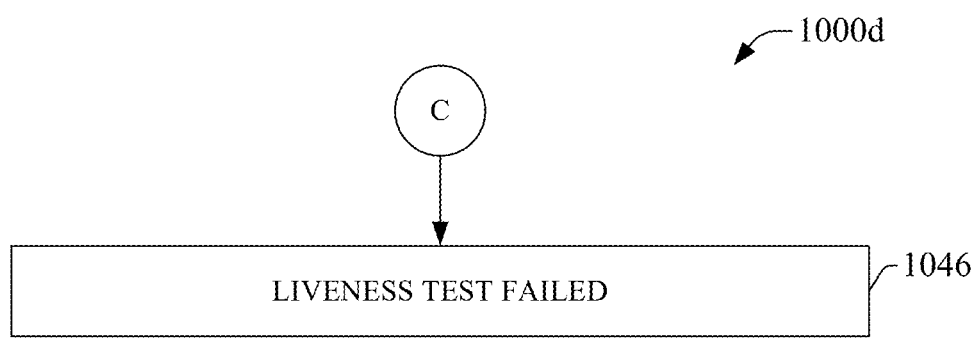
FIG. 10d is a flowchart of a fourth part of the example methodology for verifying physical presence of a live person at a client device or information terminal.

FIG. 10*a* illustrates a first part of an example methodology 1000*a* for verifying physical presence of a live person at a client device or information terminal. Initially, at 1002, a liveness detection test for verifying presence of a live person at a client device is initiated. In an example scenario, the test may be initiated as part of a user session with a higher-level system requiring liveness verification, such as a banking system, a medical system, an electronic signature system, or other such application. At 1004, live video data from the client device is analyzed to determine whether an image of a user's face is present within the video data. The video data can be captured by a camera associated with the client device and oriented to capture video of a space in front of the client device, including a space in which a user's head is expected to be located while the user is interacting with the client device.

At 1006, a determination is made as to whether an image of a face is detected within the video data. If no facial image is detected (NO at step 1006), the methodology continues to wait until the face is detected within the video data, or until a time-out duration expires. Alternatively, if the image of the face is detected in the video data (YES at step 1006), the methodology proceeds to step 1008, where the current position of the user's face within the frame of the video is recorded.

At 1010, a box is generated and superimposed at a position within the frame of the video that is outside the current position of the face. The box can be positioned such that there is little or no overlap between the box and the image of the face within the video. At 1012, an instruction to position the user's face inside the box is rendered on the client device. At 1014 a determination is made as to whether the image of the user's face has moved inside the superimposed box. The methodology then waits until either the image of the face moves inside the box or a defined time-out period expires. If the time-out period expires, the liveness detection test can abort and liveness is not verified. Alternatively, if the image of the face is detected inside the box prior to expiration of the defined time-out period (YES at step 1014), the methodology proceeds to the second part 1000*b* illustrated in FIG. 10*b*.

At 1016, a capture sequence S(t) for capturing a sequence of frames of the video data is defined. The capture sequence can define a series of time points at which respective still frames of the video data will be captured. The capture sequence S(t) can also specify a number of frames N that will be captured by the sequence. At 1018, a margin color is defined for each capture of the sequence S(t). The margin color refers to the color of a margin that borders the periphery of the video frame. The margin color for each capture can be set to be one of two available, highly contrasted colors; e.g., either black or white, or two other colors that contrast highly with one another. The margin color for each capture can be set randomly or semi-randomly, or may be a predefined sequence in some embodiments.

At 1020, a variable t is set to 1 to initialize the frame capture sequence. At 1022, the frame capture sequence begins by setting the color of the margin of the video frame to the color specified for the present capture by the sequence S(t) and capturing a frame X(t) of the video data. At 1024, a determination is made as to whether the image of the face within the video frame is still within the box. If the face is not within the box (NO at step 1024), the methodology proceeds to step 1030, where the liveness test is aborted or reinitiated and liveness is not verified. Alternatively, if the face is still within the box (YES at step 1024), the methodology proceeds to step 1026, where a determination is made as to whether the variable t is equal to the maximum number of frames N. If the maximum number of frames N has not been captured for the sequence (NO at step 1026), the methodology proceeds to step 1028 where the value of the variable t is incremented. Steps 1022-1026 are then repeated to capture the next video frame in the sequence. Steps 1022-1028 repeat until N frames have been collected (YES at step 1026), and the methodology then proceeds to the third part 1000*c* illustrated in FIG. 10*c*.

At 1032, the frames [X(1), X(2), ... X(N)] that were captured using steps 1020-1028 are analyzed to determine whether the head pose of the image of the face in each frame is consistent with the position of the box within the frame relative to the original location of the face (captured at step 1008). For example, the captured frames can be analyzed to determine whether the direction and degree of head tilt, as well as the direction and degree of turn of the user's head, falls within expectations given that the box was rendered to the left (or to the right) of the image of the face. The distance of the box from the original location of the face may also be taken into consideration when determining the expected head pose in some embodiments.

At 1034, a determination is made as to whether the head pose in each of the captured frames is consistent with the position of the box based on the analysis at step 1032. If the head pose is consistent (YES at step 1034), the methodology proceeds to step 1036, where the captured frames are further analyzed to determine whether movements of the image of the head between frames is consistent with a recording of a live person. For example, the sequence of frames can be analyzed to determine whether the position of the head varies between frames by a magnitude greater than zero but smaller than a defined threshold, as would be expected of a live person even while attempting to maintain a fixed position. In this regard, lack of small variations in the head position between frames may be indicative of a still photograph of a person, while larger variations in excess of a defined threshold may be indicative of a jump in a spoofing video stream or a failure of the user to maintain the correct position.

If the movements are consistent with a live person (YES at step 1038), the methodology proceeds to step 1040, where the captured frames are further analyzed to determine whether magnitudes of brightness or reflection measured from the images of the face within the frames are consistent with expected magnitudes of brightness—or changes in the magnitudes of brightness—given the margin colors set for each frame of the sequence S(t). For example, the frames can be analyzed to confirm that a transition from a frame whose margin color was black to a successive frame whose margin color was set to white causes a corresponding change in brightness or reflection of the image of the face between those frames. In some embodiments, this step may also verify that an amount of contrast between facial shadows and portions of the face that are not in shadow vary between frames as expected given the margin colors set for the respective frames.

At 1042, a determination is made as to whether the reflections measured from the image of the face in the captured frames are consistent with expectations based on the analysis performed at step 1040. If the reflections are consistent with expectations (YES at step 1042), the methodology proceeds to step 1044, where liveness is confirmed. If any of steps 1034, 1038, or 1042 fail their respective tests (NO at steps 1034, 1038, or 1042), the methodology proceeds to the fourth part 1000*d* illustrated in FIG. 10*d*. At 1046, the liveness test is indicated as having failed and liveness is not verified.

Embodiments, systems, and components described herein, as well as control systems and automation environments in which various aspects set forth in the subject specification can be carried out, can include computer or network components such as servers, clients, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Figure 11:
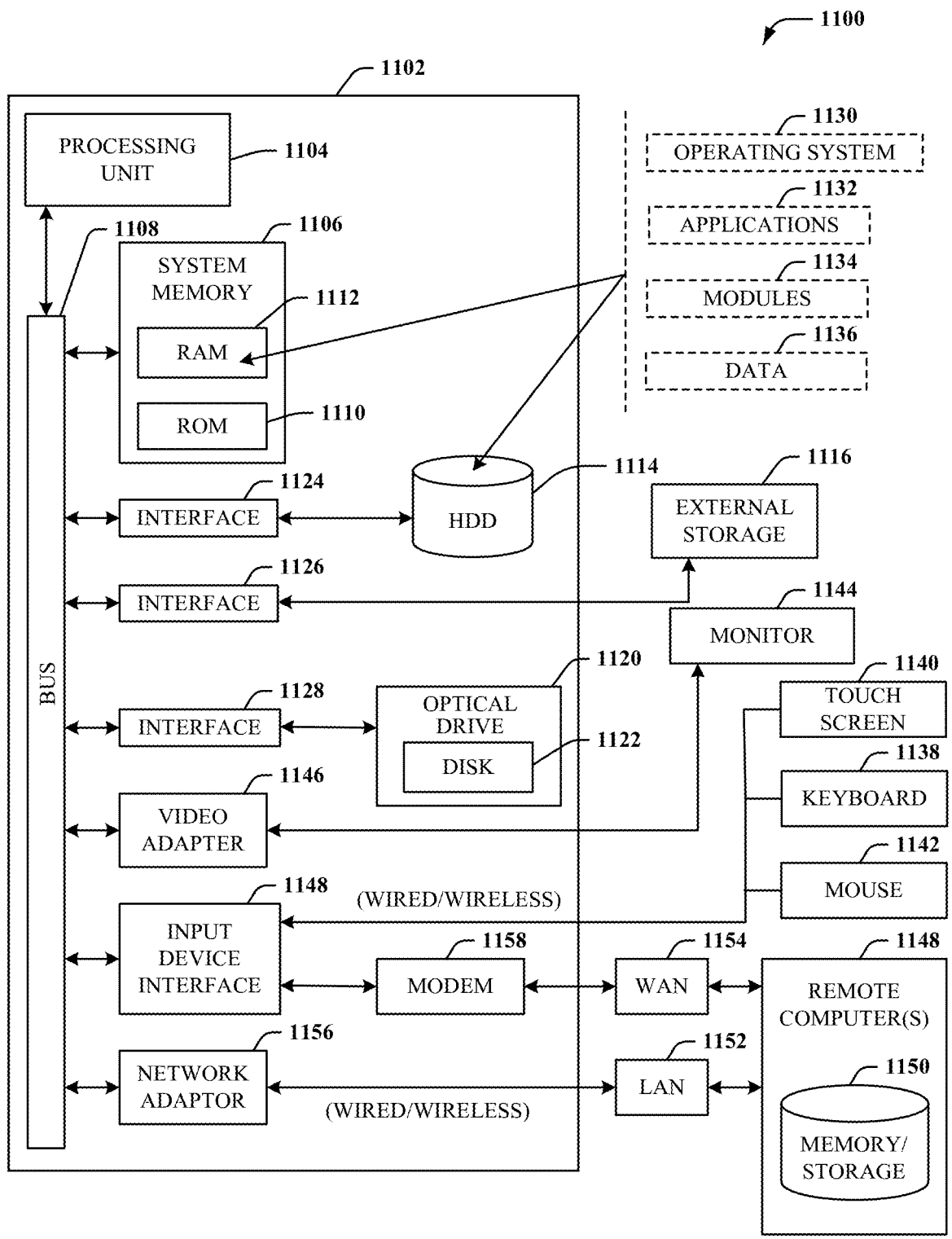
FIG. 11 is an example computing environment.
Figure 12:
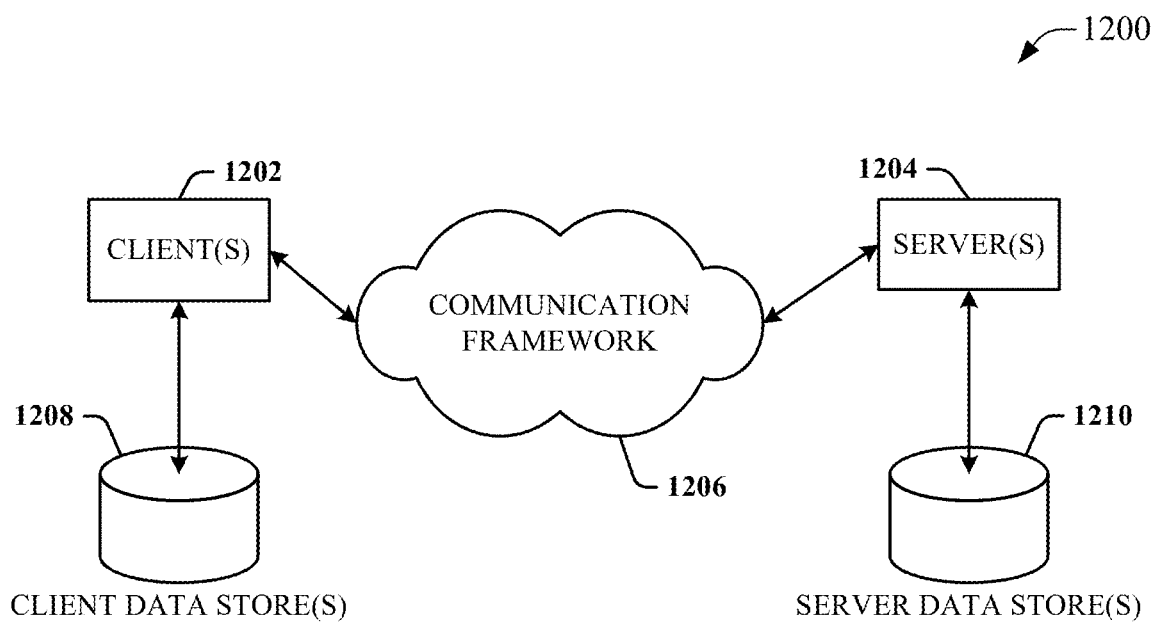
FIG. 12 is an example networking environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. This discussion, while not directly related to the inventive liveness detection approach described herein, describes example, non-limiting hardware platforms and contexts in which the liveness detection system can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for application programs 1132. Runtime environments are consistent execution environments that allow application programs 1132 to run on any operating system that includes the runtime environment. Similarly, operating system 1130 can support containers, and application programs 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1148 that can be coupled to the system bus 1108, but can be connected by other interfaces, such as a parallel port, an IEEE 1394 serial port, a game port, a USB port, an IR interface, a BLUETOOTH® interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the adapter 1156 in a wireless mode.

When used in a WAN networking environment, the computer 1102 can include a modem 1158 or can be connected to a communications server on the WAN 1154 via other means for establishing communications over the WAN 1154, such as by way of the Internet. The modem 1158, which can be internal or external and a wired or wireless device, can be connected to the system bus 1108 via the input device interface 1148. In a networked environment, program modules depicted relative to the computer 1102 or portions thereof, can be stored in the remote memory/storage device 1150. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1152 or WAN 1154 e.g., by the adapter 1156 or modem 1158, respectively. Upon connecting the computer 1102 to an associated cloud storage system, the external storage interface 1126 can, with the aid of the adapter 1156 and/or modem 1158, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . )

What is claimed is:

1. A system, comprising:
a processor that executes computer-executable instructions stored in a computer-readable memory, wherein execution of the computer-executable instructions causes the processor to:
superimpose a box on a video being presented on a client device, wherein the video is a live video of a space in front of the client device;
set, based on a determination of a location of a face in the video, a location of the box within the video that causes at least most of an image of the face to be outside the box prior to the image of the face moving to a location inside the box;
define a flash pattern as a series of bright and dark flashes;
in response to determining that the image of the face within the video has moved to the location inside the box, capture a sequence of frames of the video while controlling an amount of illumination cast into the space in accordance with the flash pattern, wherein the sequence of frames is captured after the image of the face has moved to the location inside the box and while the image of the face remains within the location inside the box; and
output, after the capture of the sequence of frames, a liveness verification result based on an analysis of the sequence of frames.

2. The system of claim 1, wherein the liveness verification result is based on a determination of whether a head pose of the image of the face in the sequence of frames satisfies a first criterion and a determination of whether changes in brightness of the image of the face in the sequence of frames satisfies a second criterion.

3. The system of claim 2, wherein the liveness verification result indicates that liveness is not verified in response to a determination by the analysis that the head pose of the image of the face does not conform to an expected head pose consistent with a location of the box within the video.

4. The system of claim 3, wherein the expected head pose comprises a direction of head tilt and a degree of head tilt that satisfies a direction of head tilt criterion and a degree of head tilt criterion, respectively.

5. The system of claim 2, wherein the liveness verification result indicates that liveness is not verified in response to a determination by the analysis that the image of the face changes position between consecutive frames of the sequence of frames by an amount that exceeds a defined position change threshold.

6. The system of claim 1, wherein the controlling of the amount of illumination cast into the space comprises at least one of, for respective captures of the sequence of frames:
setting a color of a margin of the video to black or white in accordance with the flash pattern, or
setting a state of an illumination source to on or off in accordance with the flash pattern.

7. The system of claim 2, wherein the liveness verification result indicates that liveness is not verified in response to a determination by the analysis that the changes in brightness of the image of the face in the sequence of frames does not correspond to the flash pattern.

8. The system of claim 2, wherein the execution of the computer-executable instructions causes the processor to define the flash pattern as at least one of a random sequence, a semi-random sequence, or a pre-defined sequence.

9. A computer-implemented method, comprising:
rendering, by a system comprising a processor, a box on a video being presented on a client device, wherein the video is a live video of a space in front of the client device;
setting, based on a determination of a location of a face in the video, a location of the box within the video that causes at least most of an image of the face to be outside the box prior to the image of the face moving to a location inside the box;
defining, by the system, a flash pattern as a series of bright and dark flashes;
in response to determining that the image of the face within the video has moved to the location inside the box:
flashing, by the system, an illumination source directed into the space in accordance with the flash pattern;
capturing, by the system, a sequence of frames of the video in synchronization with the flash pattern, wherein the sequence of frames is captured after the image of the face has moved to the location inside the box and while the image of the face remains within the location inside the box; and
generating, by the system after the capturing of the sequence of frames, a liveness verification result based on an analysis of the sequence of frames.

10. The computer-implemented method of claim 9, wherein the generating of the liveness verification result comprises generating the liveness verification result based on a determination of whether a head pose of the image of the face in the sequence of frames satisfies a first criterion and a determination of whether changes in brightness of the image of the face between frames of the sequence of frames satisfies a second criterion.

11. The computer-implemented method of claim 10, wherein the generating of the liveness verification result comprises, in response to determining that the head pose of the image of the face does not conform to an expected head pose consistent with a location of the box within the video, indicating that liveness is not verified.

12. The computer-implemented method of claim 11, wherein the expected head pose comprises at least one of a direction of head tilt or a direction of head turn that satisfies a criterion.

13. The computer-implemented method of claim 10, wherein the generating of the liveness verification result comprises, in response to determining that the image of the face does not change position between frames of the sequence of frames or that the image of the face changes position between consecutive frames of the sequence of frames by an amount that exceeds a defined position change threshold, indicating that liveness is not verified.

14. The computer-implemented method of claim 9, wherein the rendering of the box comprises rendering the box at a location within the video that causes at least most the image of the face to be outside of the box prior to the image of the face moving to the location inside the box.

15. The computer-implemented method of claim 9, wherein the flashing of the illumination source comprises at least one of:
   flashing a color of a margin of the video between black and white in accordance with the flash pattern, or
   flashing a state of a light source between on and off in accordance with the flash pattern.

16. The computer-implemented method of claim 10, wherein the generating of the liveness verification result comprises, in response to determining that the changes in brightness of the image of the face between the frames does not correspond to the flash pattern, indicating that liveness is not verified.

17. The computer-implemented method of claim 10, wherein the defining of the flash pattern comprises defining the flash pattern at least one of randomly, semi-randomly, or according to a predefined pattern.

18. A computer program product for facilitating liveness detection, the computer program product comprising a computer-readable memory having program instructions embodied therewith, the program instructions executable by a processor to cause the processor to:
   display a box on a video being presented on a client device, wherein the video is a substantially real-time video of a space in front of the client device;
   set, based on a determination of a location of a face in the video, a location of the box within the video that causes at least most of an image of the face to be outside the box prior to the image of the face moving to a location inside the box;
   define a flash pattern as a series of bright and dark flashes;
   in response to determining that the image of the face within the video has moved to the location inside the box:
      flash an illumination source directed into the space in accordance with the flash pattern;
      record a sequence of frames of the video in synchronization with the flash pattern, wherein the sequence of frames is captured after the image of the face has moved to the location inside the box and while the image of the face remains within the location inside the box; and
   generate, after the sequence of frames is recorded, a liveness verification result based on an analysis of the sequence of frames.

19. The computer program product of claim 18, wherein the liveness verification result indicates whether liveness of a person at the client device is verified based on a determination of whether a head pose of the image of the face in the sequence of frames satisfies a first criterion and a determination of whether changes in brightness of the image of the face between frames of the sequence of frames satisfies a second criterion.

* * * * *